H. D. GOODRICH.
Oiling Wheel Axles.
No. 201,518.  Patented March 19, 1878.
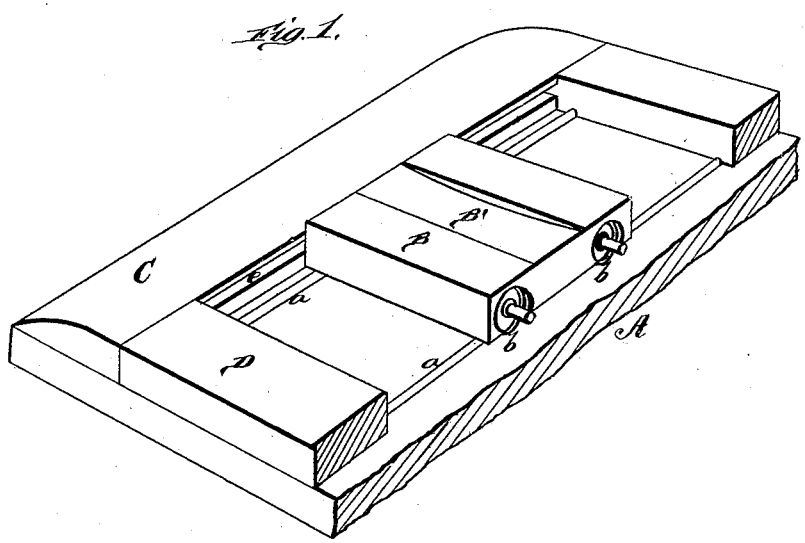
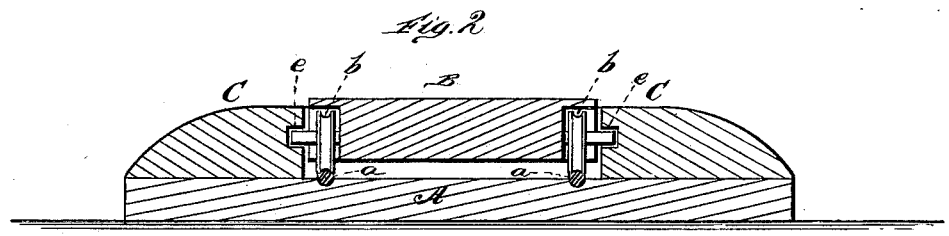
WITNESSES
Robt Emmett
Jas. J. Sheehy.
INVENTOR.
Herbert D. Goodrich
Gilmore, Smith & Co.
ATTORNEYS.

UNITED STATES PATENT OFFICE.

HERBERT DAVID GOODRICH, OF FITCHBURG, MASSACHUSETTS.

IMPROVEMENT IN OILING WHEEL-AXLES.

Specification forming part of Letters Patent No. 201,518, dated March 19, 1878; application filed March 2, 1878.

*To all whom it may concern:*

Be it known that I, HERBERT DAVID GOODRICH, of Fitchburg, in the county of Worcester and State of Massachusetts, have invented a new and valuable Improvement in Removing Wheels from the Axles of Light and Heavy Carriages or Wagons, called a "Wheel-Jack;" and I do hereby declare that the following is a full, clear, and exact description of the construction and operation of the same, reference being had to the annexed drawings, making a part of this specification, and to the letters and figures of reference marked thereon.

Figure 1 of the drawings is a representation of perspective sectional view of my lifting-jack, and Fig. 2 is a transverse vertical section of the same.

The nature of my invention consists in a machine for moving carriage and heavy wagon wheels on the arm for oiling the same, as will be hereinafter more fully set forth.

The annexed drawings, to which reference is made, fully illustrate my invention.

A represents the bed or platform of my machine, upon which are two longitudinal rails, *a a*. B represents a smaller platform, provided with wheels or rollers *b b*, to run on the rails *a a*, whereby said platform B can be moved back and forth on the main platform, as required.

On the upper surface of the main platform, along each side, is a bar, C, extending close to the inner platform B; but said bars C C are not as high as the said platform B. The inner edge of each bar C is formed with a longitudinal groove, *e*, into which projects a flange, one or more pins, or the journals of the rollers *b*, so as to hold the movable platform onto the main platform, and prevent the movable platform from being lifted out of place. Similar bars D D are also attached at the ends of the main platform.

By this machine I can move the wheels of carriages and heavy wagons on their arms for oiling the same without raising the body by purchase under the axle, as in the usual way.

The wheel is drawn onto the inside platform B, and rests in a depression, B', thereon, the outer edges of the bars C C being rounded or beveled, to facilitate the drawing of the wheel over the same. By now unscrewing the nut on the end of the axle, the wheel can be moved outward on the axle-arm by moving the inside platform B.

The dimensions of the device should be such that the wheel can be moved forward and back the entire length of the axle-arm.

The advantage of this mode of oiling is, that the oil is not scraped off when the wheel is replaced, because the bearing is on the bottom of the axle instead of on the top, as in the usual way of oiling carriages. It also saves time and labor.

I claim as new and desire to secure by Letters Patent—

A movable platform, B, arranged upon wheels on top of a main platform, A, and confined by means of bars C C and D D, substantially in the manner and for the purposes herein set forth.

In testimony that I claim the above I have hereunto subscribed my name in the presence of two witnesses.

HERBERT DAVID GOODRICH.

Witnesses:
 GEORGE W. MACK,
 ISAAC H. CURRIER.